United States Patent [19]
Harding

[11] Patent Number: 4,983,043
[45] Date of Patent: Jan. 8, 1991

[54] HIGH ACCURACY STRUCTURED LIGHT PROFILER

[75] Inventor: Kevin G. Harding, Ann Arbor, Mich.

[73] Assignee: Industrial Technology Institute, Ann Arbor, Mich.

[21] Appl. No.: 289,486

[22] Filed: Dec. 21, 1988

Related U.S. Application Data

[63] Continuation of Ser. No. 39,670, Apr. 17, 1987, abandoned.

[51] Int. Cl.$^5$ .............................................. G01B 11/24
[52] U.S. Cl. ......................................... 356/376; 356/1
[58] Field of Search ............................ 356/1, 375, 376

[56] References Cited

U.S. PATENT DOCUMENTS

| | | | |
|---|---|---|---|
| 3,187,185 | 6/1965 | Milnes | 356/376 |
| 3,612,890 | 10/1971 | Cornyn, Jr. et al. | 356/381 |
| 3,671,126 | 6/1972 | Erb | 356/376 |
| 3,773,422 | 11/1973 | Stavis et al. | 356/376 |
| 3,796,492 | 3/1974 | Cullen | 356/376 |
| 3,909,131 | 9/1975 | Waters | 356/376 |
| 4,040,738 | 9/1977 | Wagner | 356/376 |
| 4,088,408 | 5/1978 | Burcher et al. | 356/376 |
| 4,105,925 | 8/1978 | Rossol et al. | 356/376 |
| 4,113,389 | 9/1978 | Kaye | 356/373 |
| 4,188,544 | 2/1980 | Chasson | 356/376 |
| 4,248,532 | 2/1981 | Nosler | 356/376 |
| 4,373,804 | 2/1983 | Pryor et al. | 356/376 |
| 4,396,945 | 8/1983 | DiMatteo et al. | 356/375 |
| 4,453,083 | 6/1984 | Bohliinder et al. | 356/376 |
| 4,472,056 | 9/1984 | Nakagawa et al. | 356/376 |
| 4,473,750 | 9/1984 | Oshida et al. | 356/376 |
| 4,493,968 | 1/1985 | Brown | 356/376 |
| 4,498,773 | 2/1985 | von Bieren | 356/376 |
| 4,583,857 | 4/1986 | Grammerstorff | 356/376 |
| 4,650,333 | 3/1987 | Crabb et al. | 356/381 |
| 4,674,869 | 6/1987 | Pryor et al. | 356/376 |

FOREIGN PATENT DOCUMENTS 00804 1/1987 Japan.

Primary Examiner—Richard A. Rosenberger
Attorney, Agent, or Firm—Harness, Dickey & Pierce

[57] ABSTRACT

An optical gauging system for evaluating the surface shape of a workpiece along a particular cross section. The gauging system includes an illumination system which projects a line of light onto the workpiece surface. A viewing system is focused along a line which is illuminated when a workpiece surface is intersected by the line of light. The focused line of the viewing system is imaged onto a linear detector array. A translation mechanism is provided which moves the line of light and the focused line of the viewing system into the workpiece along the plane of the cross section of interest. The relationship between the translation mechanism and the output of the array is related to the profile shape of the workpiece along the cross section of interest.

11 Claims, 4 Drawing Sheets

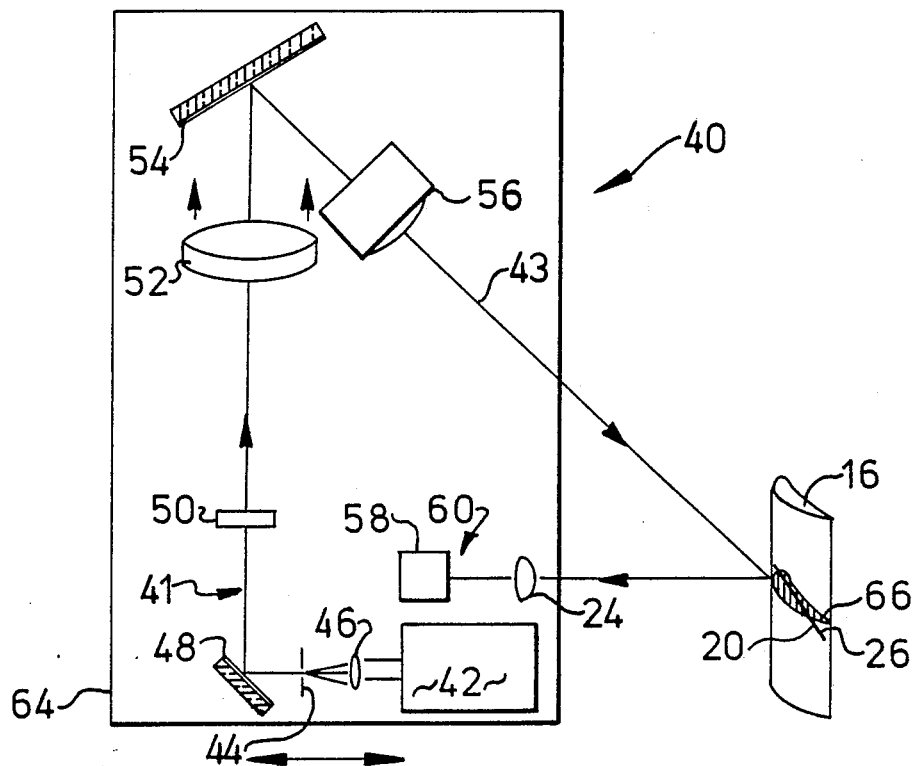
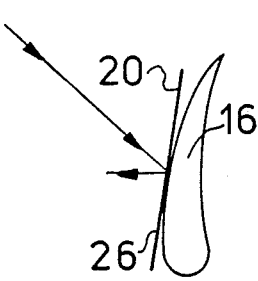
FIG 7
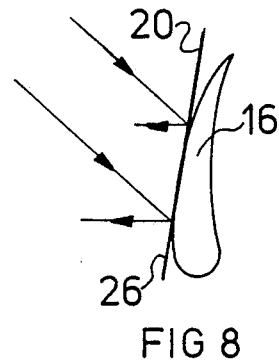
FIG 8

HIGH ACCURACY STRUCTURED LIGHT PROFILER

This is a continuation of U.S. patent application Ser. No. 39,670 filed Apr. 17, 1987, now abandoned.

BACKGROUND OF THE INVENTION

This invention relates to a noncontacting optical gauging system and particularly to such a system which illuminates a target surface with a line of light which is evaluated to provide a measure of the surface contour of the target surface.

Optically based gauging systems are presently employed in industry for evaluating the profile shape of workpieces such as turbine blades, gears, helical threads, etc. These devices have inherent advantages over contacting-type mechanical gauges in that they can generally operate at greater speeds and are not subjected to mechanical wear. In one example of an optical gauge according to the prior art, a line or sheet of light is projected onto the object to be characterized. The illuminated portion of the object is viewed with a two-dimensional video camera along an axis at some different angle than the illumination beam. Accordingly, the line of light illuminates a profile of a cross section of the part which is viewed by the camera, just as if the part had been sliced along the light beam. Points nearer to the light source will be illuminated to one side of the field of view of the camera, while further points will be seen illuminated on the other side of the camera's field of view.

The above-described optical gauging techniques have a number of significant limitations. In many instances, it is desirable to evaluate a workpiece surface along a particular cross section, such as perpendicular to the axis of symmetry of a turned workpiece, or along the chord of a turbine engine blade, etc. To characterize such a cross section in one view normally requires the illuminating line of light to be brought in precisely along the specific cross section plane. To evaluate the workpiece contour, the camera views the surface at an angle from the axis of illumination; which produces magnification errors across the surface (the so called "keystone effect") which complicates data processing. Moreover, viewing the plane of interest off axis requires the viewing system to have a depth of field adequate to encompass the depth of interest, which may be difficult to achieve for some workpieces. Illumination systems for such devices also have their own limitations. To provide resolution, the depth of focus of the illuminating line of light must be adequate to encompass the depth of interest. This requirement leads to a greater line width, thus sacrificing accuracy. Finally, those systems are further limited by the pixel resolution of the video image processor.

Alternate gauging approaches such as coordinate measuring machines (CMMs) obtain their accuracy by means of a high precision encoded translation stage. The operational speed of such systems is, however, limited by the use of contact probes which requires the machine to stop and very slowly approach each measurement point. As a hybrid approach, noncontact triangulation probes have been attached to CMMs, but the measurements are still strictly done for selected individual points on the workpiece.

In view of the foregoing, there is a need to provide an optical gauging system which overcomes the depth-of-field and resolution limitations of prior art optical systems and which does not possess magnification variations along the evaluated image which can complicate image processing. It is further desirable to provide such a device which provides rapid gauging time and high measurement accuracy and resolution.

SUMMARY OF THE INVENTION

An optical gauging system achieving the above-mentioned desirable features is provided in accordance with this invention. The illumination system of this invention illuminates the surface to be characterized with a line of light which illuminates the surface of interest which may be incident to the subject at some angle from the plane of the cross section of interest. The subject is viewed by a viewing system which images a line of constant range onto a high resolution linear detector array. In one embodiment, the optical axis of the viewing system lies within the plane of the cross section of interest. The illuminating line of light and the focus of the viewing system are then translated in the depth direction with respect to the surface using a position encoded translation stage. As the line of light sweeps past the section on the subject which is imaged onto the detector array, the points of intersection as indicated by the illuminated spots on the workpiece surface are correlated with the position of the translation stage. Accordingly, data are provided giving the relationship between the stage position and elements of the array which are illuminated, which are related to the surface contour and tilt of the target surface.

In the system according to this invention, the distance from the illuminating source to the points of intersection with the line on the subject being viewed (i.e. range) is constant. Accordingly, a sharply focused line can be used to illuminate the subject and the line will always be at best focus when it intersects the region on the subject being viewed by the detector array. Similarly, the distance from the detector array to the point of intersection of the illuminating ray is also constant, thus enabling the viewing system to operate within a narrow depth of field at best focus. Preferably, the light source and detector array are not translated to obtain this constant distance relationship. Instead, the path lengths can be maintained constant and any motion of the beam and array isolated from vibrations or wobble of the translation stage through fixedly mounting the light source and array, and moving only the optical elements of the system. Several of the embodiments of the present invention disclose various means for translating the illuminating beam and focus of the viewing system along the workpiece surface being characterized in a manner which isolates any wobble or vibration of the translation stage.

Additional benefits and advantages of the present invention will become apparent to those skilled in the art to which this invention relates upon a reading of the described preferred embodiments of this invention taken in conjunction with the accompany drawings

DESCRIPTION OF DRAWINGS

FIG. 3 is an optical gauging system in accordance with a second embodiment of this invention in which all the components of the gauge are movable with the translation stage.

FIGS. 7 through 10 illustrate the intersection of the illuminating line of light and the line imaged by the detector array as they cut into a workpiece along the plane of interest.

DETAILED DESCRIPTION OF THE INVENTION

Figure 1:
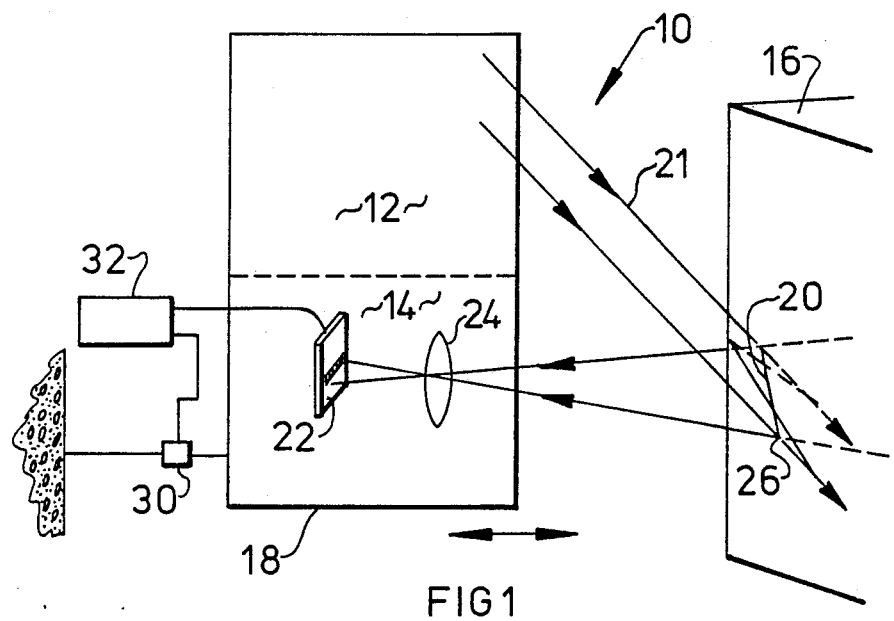
FIG. 1 is a pictorial concept drawing illustrating a first embodiment of the present invention which discloses the general principles of the optical gauging systems according to this invention.

A high accuracy structured light profiler in accordance with the first embodiment of this invention is shown in schematic fashion in FIG. 1, and is generally designated there by reference number 10. Profiler 10 primarily consists of illumination system 12 and viewing system 14. Profiler 10 is shown being employed to characterize the shape of an exemplary generally cube shaped workpiece 16. Profilers in accordance with this invention however, are adapted for characterizing the surface shapes of numerous prismatic or contoured workpieces. Translation stage 18 is employed to move the optical axes of both illumination system 12 and viewing system 14.

As shown in FIG. 1, illumination system 12 provides a line of light 20 on the workpiece which may be formed by a sheet of light 21 bounded by a pair of separated rays, as shown in FIG. 1. As shown, the angle of incidence between sheet of light 21 and the surface of workpiece 16 being characterized is approximately 45 degrees from the plane of the cross section of interest. Other angles of intersection may, however, be used. The angle is non-critical since it is necessary only to produce a line which is imaged at a fixed range. In fact, it is possible to have the optical axes of both illumination system 12 and viewing system 14 coaxial by causing the focuses to be coincident. Various sources of light may be employed to form line of light 20, including in a slit illuminated by a white light source. Preferably, however, a diode (or other) laser is used which may be pulsed to freeze any motion of the beam while measurements are being made. The illumination system 12 includes optical elements which image the light source onto the cross section of workpiece 16 of interest so as to produce a narrow line width in the dimension perpendicular to that cross section, while defocusing or spreading out the source in the dimension which is in the plane of the subject's cross section. Line of light 20 may be formed, for example, by an optical scanner such as a rotating mirror and a focusing lens, or by various passive optical approaches such as cylindrical lenses, etc.

The viewing system 14 principally comprises linear detector array 22 and imaging lens 24. As shown in FIG. 1, the intersection of line of light 20 presented by illumination system 12, and the line imaged by detector array 22 forms a line designated by reference number 26. Line 26 is maintained at a constant distance or range from translation stage 18. The workpiece 16 and translation stage 18 are relatively positioned so that line 26 intersects the workpiece surface at one or more points. The points of intersection are illuminated and are, therefore, imaged onto detector array 22. By maintaining workpiece 16 stationary and moving translation stage 18 in the direction of the arrows shown in FIG. 1, the position of line 26 can be varied; thus, cutting a slice into workpiece 16 along the cross section of interest. This slicing action is illustrated by FIGS. 7 through 10, which show line 26 progressively moving into the workpiece, shown there as a turbine engine blade. Accordingly, various points of the workpiece surface become imaged onto detector array 22 throughout the range of movement of translation stage 18. Detector array 22 preferably includes a large number of high resolution individual light sensitive regions. Signal processing 32 associated with array 22 locates the center element which is illuminated (or all of the illuminated points) as translation stage 18 is moved. The position of stage 18 is determined and outputted to signal processor 32 by stage position encoder 30.

Figure 2:
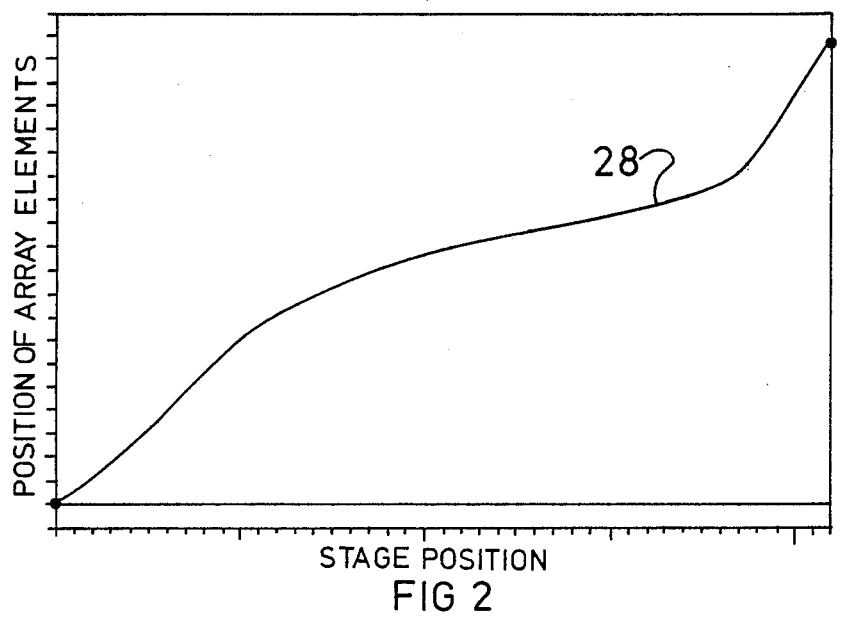
FIG. 2 is a graph showing an illustrative relationship between the translation stage position and vertical offset as indicated by the output from the detector array which provides a curve related to the profile shape of the workpiece being imaged.

FIG. 2 provides an exemplary trace resulting from operation of profiler 10 relating the position of the elements of detector array 22 illuminated, which are plotted along the ordinate, versus the position of stage 18, which is plotted along the abscissa. The characteristic curve 28 is thus derived which is related to the contours of the workpiece surface being characterized.

Structured light profiler 10 provides a sharply focused line which is used to illuminate the subject, and the line is always at best focus when it intersects the region on the subject being imaged by detector array 22. Accordingly, the only limitation to the depth of field of the device is related to the range of motion of translation stage 18. The system further provides a large field of view coverage limited only by the length of line of light 20 and the resolution across that line determined by the pixel number of array 22. The system is able to measure flat surfaces when they are tilted relative to the viewing axis and also can be used to characterize highly curved surfaces Furthermore, through slight modification, the system can be adapted to evaluate multiple cross sections of a part simply by adding multiple detection modules.

The information from light profiler 10 further permits the radius of curvature at a single point on the workpiece to be determined without the need for a high density of data points around the specific region. The curvature information is provided in the form of a center pixel location and the total number of contiguous pixels on array 22 being illuminated. This information is a direct measure of surface curvature.

A structured light profiler in accordance with a second embodiment of this invention is shown in FIG. 3 and is generally designated there by reference number 40. For this embodiment and those described hereinafter, elements which are identical to those described in connection with first embodiment will be designated by like reference numbers. For this embodiment, laser 42 is employed as a light source for illumination system 41 having an optical axis 43. Laser 42 may be a pulsed diode laser producing light in the near infrared region. In one experimental embodiment, a laser 42 was used which produced about 300 milliwatts (peak power) and was pulsed at about 50 kilohertz with a pulse duration of less than a microsecond to freeze the motion of the beam while measurements are taken. The output from laser 42 is focused onto pinhole 44 by lens 46. The point source from pinhole 44 is then reflected off steering mirror 48 and passes through cylindrical lens 50 which spreads the light in one planar direction. The ray is thereafter directed through collimating lens 52, reflected off mirror 54 and sent through focusing lens 56. This arrangement has been found to produce an illuminated line on the subject workpiece 16 at the measurement points having a width of approximately 0.001 inches.

Viewing system 60 of profiler 40 includes imaging lens 24 which focuses the line of intersection 26 with line of light 20 onto detector 58. This embodiment differs from the first with respect to the type of detector used. Detector 58 includes a single light sensitive element and optical elements which scans across line 26. Outputs from the light sensitive element and the phase of the scanning mechanism gives the location of illuminated spots across line 26.

In accordance with this embodiment, translation stage 64 of profiler 40 supports each of the above-mentioned elements of viewing system 60 and illumination system 41. Translation stage 64 is movable in the direction of the arrows shown in FIG. 3 to cause the imaged line 26 formed by the intersection of line of light 20 and that imaged onto detector 58 to be translated into the cross section being characterized on workpiece 16, which is graphically represented by reference number 66. In other respects, profiler 40 operates in a manner identical to that of profiler 10 as previously described.

Figure 4:
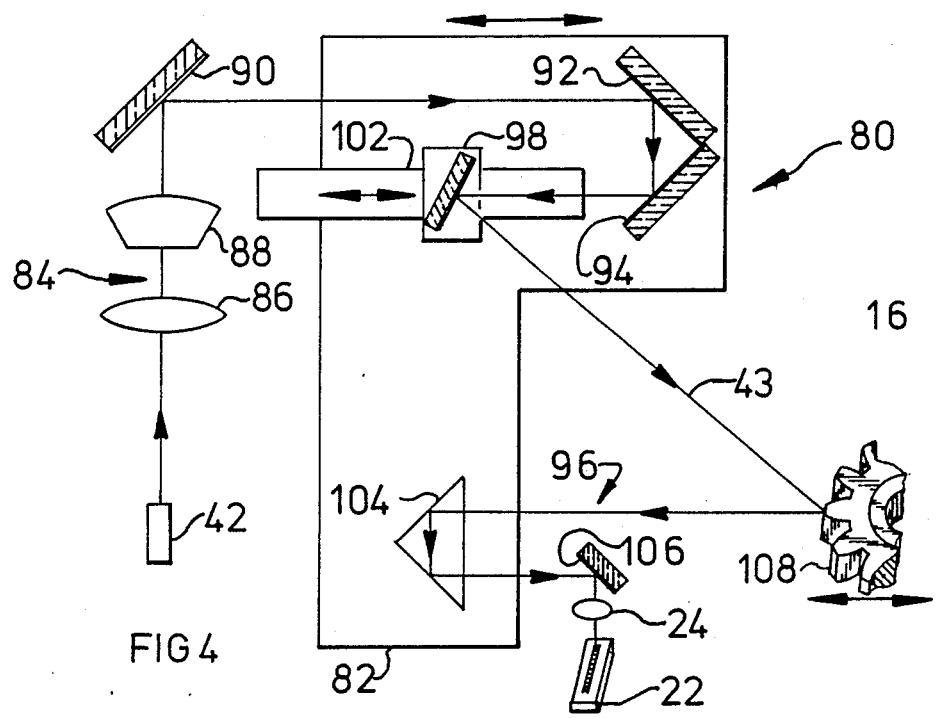
FIG. 4 is an optical gauging system in accordance with a third embodiment of this invention utilizing a translation stage with a separately movable follower mirror which enables both the light source and detector array to be fixed to a support structure.
Figures 9, 10:
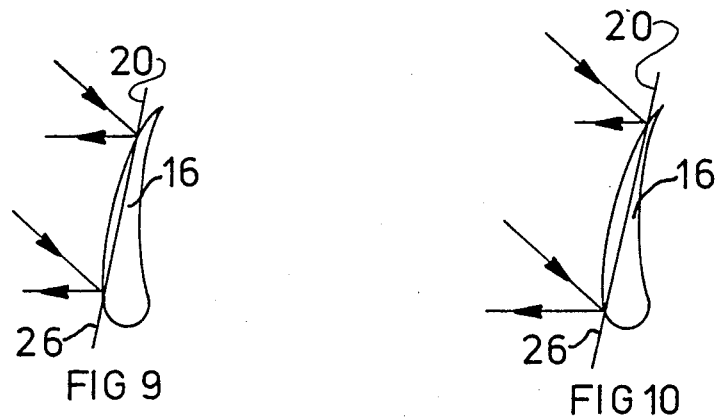

FIG. 4 illustrates a structured light profiler according to a third embodiment which is generally designated by reference number 80. Profiler 80 differs principally from the above-described embodiments in that laser source 42 and detector array 22 are fixedly mounted to a support structure and do not move with translation stage 82. This system provides the advantage of eliminating errors associated with vibration of the light source or detector when they are mounted onto the translation stage. Such mechanical isolation is very desirable since any slight wobble of the source would become a large positional error on the subject due to beam pointing changes. By not translating the source, mechanical isolation of the source and projection optics is provided which also prevents optical misalignment or failure of the source due to mechanical shock or vibrations. Profiler 80 illustrates the use of the concepts of this inveniton in evaluating the tooth profile shape of gear 108, which is another of the wide spectrum of workpieces which may be evaluated by this invention.

For profiler 80, illumination system 84 includes laser source 42 having its output passing through focusing lenses 86 and cylindrical lens 88, and is further directed off mirror 90. Two large mirrors 92 and 94 are oriented at 90 degrees to each other, and are fixed to translation stage 82 to move along the dimension of the optical axis of viewing system 96, which is designated by the arrows in FIG. 4. A separate smaller mirror 98 is provided as a constant deviation device. Mirror 98 or a constant deviation optical element is affixed to a precision sliding stage 102. For this embodiment, it is necessary to linearly move sliding stage 102 at twice the rate of movement of translation stage 82 in order that illumination and viewing systems 84 and 96 maintain proper alignment. This tracking may be accomplished by attaching stage 102 to a steel band which is fixed at one location to a support structure and circles around two wheels which are fixed to translation stage 82. Viewing system 96 of profiler 80 includes auto-focus right angle prism 104 which is affixed to and movable with translation stage 82. A fixed mirror 106 directs the received light beam through imaging lens 24 onto detector array 22.

In operation of profiler 80, the focused light from laser 42 is incident on mirror 92 at 45 degrees which directs the light onto mirror 94 at a 45 degree incident angle. The second mirror directs the light to mirror 98 affixed to sliding stage 102 at an incident angle of 72.5 degrees, which causes the light to be directed toward workpiece 16 at a 45 degree angle from the plane of the cross section of interest Sliding stage 102 causes mirror 98 to track the output beam from large mirror 94. This arrangement causes the line of light 20 to translate with the line imaged by viewing system 96. The principal advantage of using the mirror system described above for profiler 80 is that the mirrors are arranged in a constant deviation configuration such that translation stage 82 as a whole can wobble without changing the angle of the beams Another advantage is that the beam translates at twice the rate of stage movement and thus covers twice the distance that the stage travels. Moreover, there are additional disadvantages with moving the light source which are obviated by this embodiment, such as problems associated with stability, wiring and vibration induced failure.

Prism 104 attached to translation stage 82 is used to move the focus of viewing system 96 along the optical axis of a viewing system at the subject so as to keep the viewing system focus in coincidence with the focus of illumination system 84. As stage 82 moves, line 26 moves along the path of the optical axis of viewing system 96, and the focus of viewing system 96 is maintained at that line.

Figure 5:
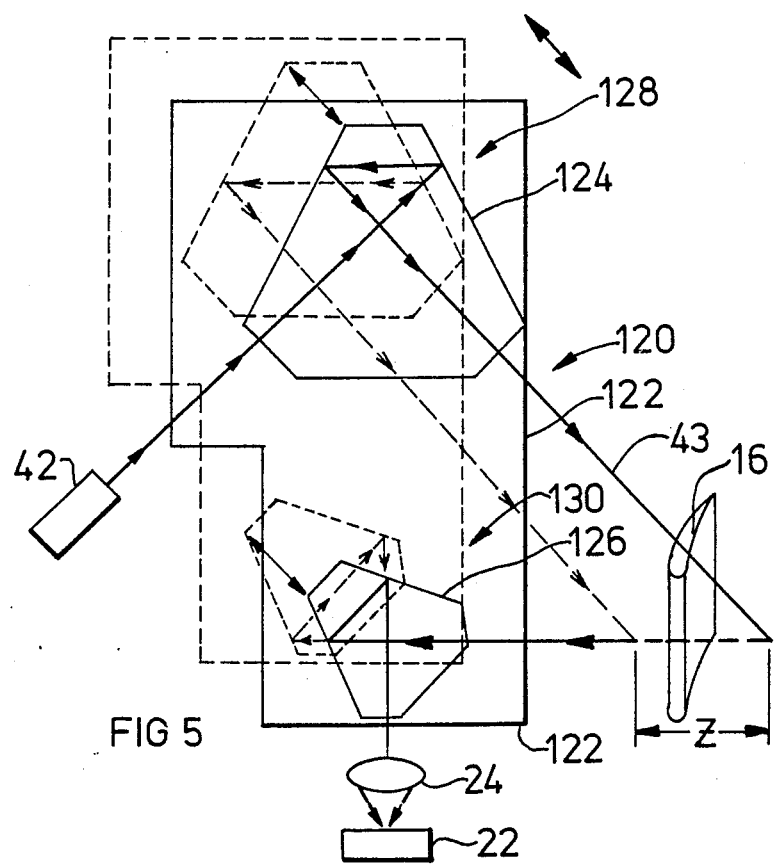
FIG. 5 is an optical gauging system in accordance with a fourth embodiment of this invention enabling the light source and detector array to be fixed to a support structure and utilizing a pair of pentaprisms in the translation stage which isolates translation stage vibrations.
Figure 6:
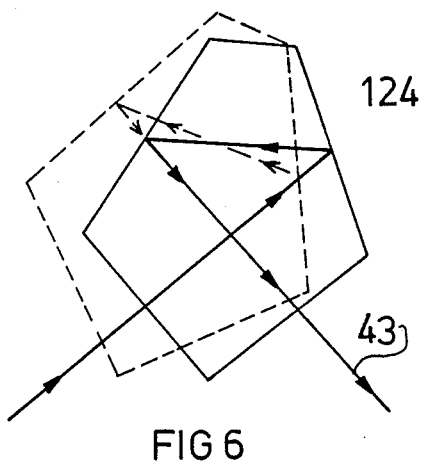
FIG. 6 is a pictorial view of a pentaprism illustrating its ability to isolate stage wobble for the gauging system shown in FIG. 5.

Yet another embodiment of a structured light profiler according to this invention is illustrated in FIG. 5 and is generally designated by reference number 120. For this embodiment, translation stage 122 carries a pair of pentaprisms 124 and 126 associated with illumination system 128 and viewing system 130, respectively. For this embodiment, laser 42 and array 22 are affixed to an associated support structure. As pentaprism 124 is translated relative to the input beam from laser 42, the output beam translates by 2 times the distance which the prism has moved. Similarly, the line imaged onto detector array 22 tracks the movement of the illumination beam by passing through pentaprism 126. The constant deviation effect provided by pentaprisms 124 and 126 provides the benefits of isolating motion of stage 122, while magnifying the translation of the stage to provide a larger measurement range. FIG. 6 graphically illustrates the characteristics of pentaprism 124 (or 126) which provides isolation from wobble of stage 122. As pentaprism 124 is rotated to the phantom line position in FIG. 6, the position of the emitted beam does not vary. With this embodiment, to move the projected line as desired, translation stage 122 is moved at 45 degrees to the plane of the cross section of interest on workpiece 16, as shown by the arrows in FIG. 5. As stage 122 is moved from the full line position to the phantom line position shown in FIG. 5, line 26 moves into the workpiece in the range designated by the letter "Z".

While the above description constitutes the preferred embodiments of the present invention, it will be appreciated that the invention is susceptible to modification, variation and change without departing from the proper scope and fair meaning of the accompanying claims.

What is claimed is:

1. An optical system for evaluating the surface shape of a workpiece along a cross section comprising:

illumination means for projecting a line or light onto said workpiece, viewing means for imaging the intersection of said line of light and said workpiece surface onto a linear detector having a plurality of light sensitive regions when some portion of said workpiece surface is at a preselected range distance relative to said illumination means, each of said light sensitive regions being illuminated with light from portions of said line of light corresponding to each of said light sensitive regions only when said portion of said workpiece surface is intersected by said corresponding portion of said line of light at said preselected range distance, said light sensitive regions not being illuminated when said workpiece surface portion is outside said preselected range distance, translation means for moving said line of light and the focus of said viewing means with respect to said workpiece along said cross section, and signal processing means for receiving a signal from said detector related to said regions of said detector which are illuminated and for recording said signals at a plurality of different positions of said translation means whereby the relationship between said signals and said translation means position characterizes said surface shape.

2. An optical system according to claim 1 wherein said detector comprises an array including number of light sensitive elements oriented along a line and wherein said signal is related to the number and position of said elements which are illuminated.

3. An optical system according to claim 1 wherein said detector comprises a number of light sensitive elements and said signal processing means determines the central position of said elements which are illuminated.

4. An optical system according to claim 1 wherein said illumination means comprises a laser light source.

5. An optical system according to claim 4 wherein said laser is pulsed to thereby freeze relative motion between said laser source and said workpiece.

6. An optical system according to claim 1 wherein said illumination means comprises a light source and lens means, and wherein said illumination means is carried by a movable portion of said translation means.

7. An optical system according to claim 1 wherein said viewing means is fixedly mounted to a movable portion of said translation means.

8. An optical system according to claim 1 wherein said illumination means comprises a light source and lens means fixedly mounted, and first optical means having portions mounted to a movable portion of said translation means for translating said line of light along said cross section and wherein said detector is fixedly mounted and said viewing means includes second optical means mounted to said movable portion of said translation means for maintaining said focus of said viewing means at said intersection.

9. An optical system according to claim 8 wherein said first optical means comprises a pair of right angle reflective surfaces and a follower mirror which is movable with respect to said translation means movable portion.

10. An optical system according to claim 1 wherein a movable portion of said translation means supports a first and second pentaprism and wherein a light source of said illumination means and said detector are fixedly mounted with respect to said translation means, said first pentaprism directing said line of light toward said workpiece and said second pentaprism directing said intersection line to said detector, and wherein said translation means movable portion moves along an axis inclined to the plane of said cross section at 45 degrees.

11. An optical system according to claim 1 wherein said linear detector comprises a scanning detector.

* * * * *

UNITED STATES PATENT AND TRADEMARK OFFICE
CERTIFICATE OF CORRECTION

PATENT NO. : 4,983,043

DATED : January 8, 1991

INVENTOR(S) : Kevin G. Harding

It is certified that error appears in the above-identified patent and that said Letters Patent is hereby corrected as shown below:

Column 7, Line 9, Claim 1, delete "or" and insert in place thereof --of--.

Column 7, Line 37, Claim 2, after the word "including", insert --a--.

Signed and Sealed this

Thirtieth Day of June, 1992

Attest:

DOUGLAS B. COMER

Attesting Officer

Acting Commissioner of Patents and Trademarks